United States Patent
Heath

[15] 3,665,806
[45] May 30, 1972

[54] FLUID OPERATED SERVOMECHANISM

[72] Inventor: Ronald Alfred Heath, Harborne, Birmingham, England

[73] Assignee: Joseph Lucas (Industries) Limited, Birmingham, England

[22] Filed: Sept. 17, 1969

[21] Appl. No.: 858,688

[30] Foreign Application Priority Data

Sept. 30, 1968    Great Britain......................46,267/68

[52] U.S. Cl..........................................91/52, 91/3, 91/388, 91/461
[51] Int. Cl....................................F15b 13/042, F15b 13/16
[58] Field of Search ...................................91/3, 388, 52, 461

[56] References Cited

UNITED STATES PATENTS 3,386,343    6/1968    Gray..........................................91/388

3,396,631    8/1968    Woodward...................................91/3

FOREIGN PATENTS OR APPLICATIONS 721,373    6/1942    Germany......................................91/3

Primary Examiner—Paul E. Maslousky
Attorney—Holman & Stern

[57] ABSTRACT

A servomechanism in which a double-acting fluid operated device, as for example a piston and cylinder unit, is controlled by a fluidic circuit via a relay valve. The circuit comprises a fixed and a variable flow restrictor in series, with variable restrictor being controlled by the position of the double-acting device. A pressure signal applied to one of the restrictors generates between the restrictors one control signal for a fluidic proportional amplifier. A second pressure signal forms the other control signal for the amplifier. Output signals from the amplifier serve to position the moving element of the relay valve and hence position the moving element of the double-acting device.

9 Claims, 2 Drawing Figures

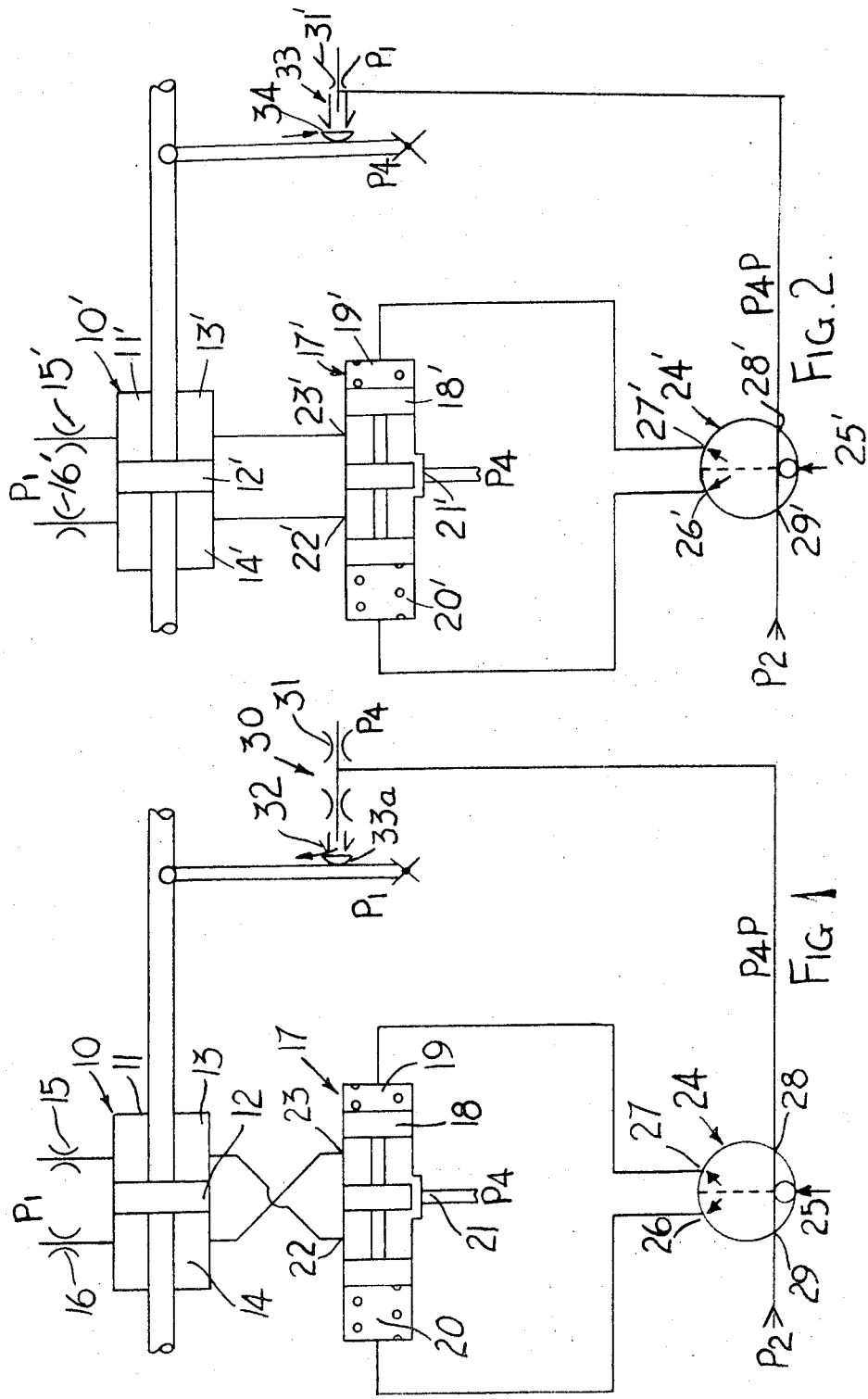

FLUID OPERATED SERVOMECHANISM

BACKGROUND OF THE INVENTION

This invention relates to a fluid operated servomechanism.

It is an object of the invention to provide such a servomechanism in which the mechanical output displacement is a function of the ratio of two input pressure signals.

SUMMARY OF THE INVENTION

A servomechanism for providing a mechanical displacement output which is a function of the ratio of two input pressure signals comprises a double-acting fluid pressure operated device having a pair of pressure chambers and an output member movable under the influence of pressures in said chambers, a fluid circuit including a fixed flow restrictor and a variable flow restrictor connected in series with the fixed restrictor and the variable restrictor being mechanically coupled to said output member to vary the flow area of said variable flow restrictor, with one pressure signal being applied, in use, to said fluid circuit to cause fluid flow therethrough, so as to create a modified pressure in said circuit between the flow restrictors, such modified pressure signal being a function of said one pressure and the displacement of the output member, a control device having an inlet for pressurized fluid, a pair of outlets and a pair of control ports, a further pressure signal being applied to one of said ports and said modified pressure signal being applied to the other of said ports, said control device delivering equal pressures at its two outlets when its control ports receive equal control pressures and different pressures when different control pressures are received at the control ports, a fluid operated relay valve having a control element to which the pressures obtaining at the outlets of the control device are applied to urge the control element in opposite directions, said control element serving to divide fluid flow from an inlet port of the relay valve between a pair of outlet ports, such that the flows from said outlet ports are equal when the pressures applied to the control parts of the control device are equal, said outlet ports being connected respectively to the fluid chambers of the double-acting device, and a pair of flow restrictors through which fluid can escape from said chambers respectively, the arrangement being such that for any value of the ratio of the pressure signals there is a corresponding stable equilibrium position of the output member.

BRIEF DESCRIPTION OF THE DRAWINGS

In the accompanying drawings FIGS. 1 and 2 are diagrammatic representations of two examples of servomechanisms in accordance with the invention.

DETAILED DESCRIPTION OF THE EMBODIMENTS

In the example shown in FIG. 1, there is a double-acting fluid operated device 10 comprising a cylinder 11 and a piston 12 slidable in the cylinder and dividing its interior into pressure chambers 13, 14 of equal cross-sectional area. A pair of flow restrictors 15, 16 control flow from the chambers 13, 14 respectively.

The device 10 is supplied with fluid by means of a fluid operated relay valve 17 which comprises a spring-centered control element in the form of a spool 18. The spool 18 is movable in opposite directions from its center position by pressures applied to chambers 19, 20. The valve 17 has an inlet port 21 connected to a supply of pressurized fluid and a pair of outlet ports 22, 23 connected respectively to the chambers 13, 14 of the device 10. The spool 18 is such that, when at its center position, it divides the fluid entering the valve 17 via inlet port 21 equally between the ports 22 and 23. Displacement of the spool 18 out of its center position will vary the proportion in which the flow is divided.

A control device in the form of a known fluidic proportional amplifier 24 controls the pressures applied to the chambers 19, 20. The control device 24 has an inlet 25, a pair of outlets 26, 27 connected to the chambers 20, 19 respectively and a pair of control ports 28, 29. The device is such that equal pressure signals at the ports 28, 29 create equal pressures at the outlets 26, 27. When the pressure signals are different from one another, the outlet pressures differ likewise. Increasing pressure at port 28 causes increasing pressure at outlet 26 and decreasing pressure at outlet 27. There is a linear relationship between the control port pressures and the outlet pressures.

The control port 29 is connected to receive one ($P_2$) of the fluid pressure signals to which the servomechanism is to be sensitive. The port 28 is connected to a fluid circuit 30.

The circuit 30 includes a pair of flow restrictors 31, 32 in series between a source of the other pressure signal $P_4$ and a lower pressure $P_1$ which is also the pressure into which the flow restrictors 15, 16 discharge fluid. The restrictor 31 is a fixed orifice and the restrictor 32 is variable, having an element 33a associated therewith which is movable by the piston 12. The variable restrictor 32 is arranged so that there is generated between the flow restrictors 31, 32 a modified pressure signal proportional to the pressure signal $P_4$ and to a function of the displacement of the piston 12 from a datum position. In the arrangement of FIG. 1, the pressure $P_4$ is applied to the end of the circuit 30 remote from the variable restrictor 32 and the variable restrictor is so designed that the above mentioned function of the displacement is such that the modified pressure signal is in direct proportion to the displacement. The modified pressure signal $P_{4P}$ is applied to the control port 28 of the device 24.

In use, for any value of the ratio $P_4:P_2$ (assuming this ratio to be always in excess of unity) there is a corresponding equilibrium position of the piston 12. In this position, the restrictor 32 will be set to provide a modified signal pressure $P_{4P} = P_2$ so that equal pressures are applied to the chambers 19, 20 and there are equal flows through the restrictors 15, 16 thereby providing equal pressures in chambers 13, 14. An increase in $P_4$ or a decrease in $P_2$ will cause the pressure in chamber 20 to exceed the pressure in chamber 19 thereby causing greater flow through restrictor 15 than through restrictor 16. The pressure in chamber 13 will therefore exceed the pressure in chamber 14, so that the piston 12 moves to the left. This causes restrictor 32 to be opened until the pressure $P_{4P}$ is again equal to $P_2$. A rise in $P_2$ or fall in $P_4$ will likewise cause the piston to move to the right to restore equilibrium.

It will thus be appreciated that the displacement of the piston from its datum position is proportional to $P_2/P_4$.

In FIG. 2, elements corresponding to similar parts in FIG. 1 bear the same reference numerals except they are primed and the arrangement is such that the displacement of the piston 12' is proportional to $P_4/P_2$. The arrangement is the same as that shown in FIG. 1 except for two respects. Firstly the connections between the valve 17' and the device 10 are reversed. In other words, port 22' is connected to chamber 14' and port 23' to chamber 13'. Secondly, there is a variable restrictor 34 and a fixed restrictor 31' with the pressure $P_4$ being applied to the opposite end of circuit 33 (corresponding to circuit 30) and the variable restrictor 34 being such that $P_{4P}$ increases as flow through restrictor 34 increases.

That is, said one pressure signal P4 is applied to a side of the variable restrictor 34 remote from the fixed restrictor 31'.

Having thus described my invention, I claim as new and desire to secure by Letters Patent the following:

1. A servomechanism for providing a mechanical displacement output which is a function of the ratio of two input pressure signals, comprising a double-acting fluid pressure operated device having a pair of pressure chambers and an output member movable under the influence of pressures in said chambers, a fluid circuit including a fixed flow restrictor and a variable flow restrictor connected in series with the fixed restrictor and said variable flow restrictor being mechanically coupled to said output member to vary the flow area of said variable flow restrictor, one pressure signal being applied, in use, to said fluid circuit to cause fluid flow therethrough, so as to create a modified pressure in said circuit between the flow restrictors, such modified pressure being a function of said one pressure signal and the displacement of the output member, a control device having an inlet for pressurized fluid, a pair of outlets and a pair of control ports, a further pressure signal being applied to one of said ports and said modified pressure being applied to the other of said ports, said control device delivering equal pressures at its two outlets when its control ports receive equal control pressures and different pressures when different control pressures are received at the control ports, a fluid operated relay valve having a control element to which the pressures obtaining at the outlets of the control device are applied to urge the control element in opposite directions, said control element serving to divide fluid flow from an inlet port of the relay valve between a pair of outlet ports, such that the flows from said outlet ports are equal when the pressures applied to the control ports of the control device are equal, said outlet ports being connected respectively to the fluid chambers of the double-acting device, and a pair of flow restrictors through which fluid can escape from said chambers respectively, the arrangement being such that for any value of the ratio of the pressure signals there is a corresponding stable equilibrium position of the output member.

2. A servomechanism as claimed in claim 1 in which the double-acting device is a piston and cylinder unit.

3. A servomechanism as claimed in claim 1 in which the control element of the said relay valve is a spring-centered spool.

4. A servomechanism as claimed in claim 3 which includes chambers within the relay valve to which the pressures at the outlets of the control device are applied to urge the spool in opposite directions.

5. A servomechanism as claimed in claim 1 in which the control device is in the form of a fluid proportional amplifier.

6. A servomechanism as claimed in claim 5 in which there is a linear relationship between the pressures at the control ports and the pressures at the outlet ports of the proportional amplifier.

7. A servomechanism as claimed in claim 1 in which the said one pressure signal is applied to a side of the fixed restrictor remote from the variable restrictor.

8. A servomechanism as claimed in claim 1 in which the said one pressure is applied to a side of the variable restrictor remote from the fixed restrictor.

9. A servomechanism as claimed in claim 1 in which the modified pressure is directly proportional to the displacement in one direction of the output member.

* * * * *